United States Patent Office 2,863,766
Patented Dec. 9, 1958

2,863,766

EDM ELECTRODE MATERIAL

John S. Larkins, Jr., Birmingham, Mich., assignor to Elox Corporation of Michigan, Royal Oak, Mich., a corporation of Michigan No Drawing. Application September 20, 1957
Serial No. 685,076

2 Claims. (Cl. 75—178)

This invention relates to electrical-discharge-machining and particularly to an improved electrode material for use in such machining.

Electrical-discharge-machining, sometimes called EDM, is accomplished by providing an electrode, disposing it in spaced relationship to a conductive workpiece, and causing intermittent electrical discharge across the gap between the electrode and workpiece at preselected voltage and current values. A dielectric coolant is usually circulated in the gap zone and automatic electrode positioning and feeding means are commonly used. Such apparatus is more or less generally known in the art for drilling, milling, sawing, grinding, etc., and need not be further described.

EDM is extensively used for machining cemented carbides and tool steels. It is particularly useful in machining cavity type dies for forging, compression forming and casting. The electrode used to machine such dies is, in most instances, a replica of the article to be produced in the die, and in instances where the article to be produced is intricate in form or has much detail, the electrode may be expensive to make. These electrodes have heretofore been machined from brass. It is usual for several electrodes to be used in machining a single cavity because the electrode is eroded as the machining progresses. When machining hard steel, brass has a wear ratio of about three to one, which requires frequent change of electrodes for precision work.

Various attempts have been made to provide cast electrodes, but without success. Either the material was difficult to cast and had excessive shrinkage upon solidification, or it eroded at an excessive rate during machining and thus produced imperfect cavities or required the EDM apparatus to be shut down often to change electrodes.

The following characteristics are mandatory in a satisfactory alloy for EDM:

(1) High wear ratio of stock removal to electrode erosion;
(2) Low melting point;
(3) Low casting temperature;
(4) Low cost;
(5) Ready availability;
(6) Ease of handling by relatively inexperienced operators with simple casting apparatus;
(7) Absence of substantial sludge and oxide formation during casting;
(8) Ability to reproduce exactly and in minute detail the existing cavity;
(9) Low shrinkage upon solidification.

The prime object of my invention is to provide an improved electrode material which meets the requirements above set forth to a high degree.

Another object is to provide such a material which may be reused by remelting and casting.

Another object is to provide an improved electrode material having reduced shrinkage, especially when cast under pressure.

I have found that an alloy of zinc and tin in the ratio of 70% zinc to 30% tin meets the above conditions to an unexpected degree.

Zinc and tin are readily available in suitable commercial grades of purity, are inexpensive and are easily handled. I found that certain alloys of these materials had satisfactory low shrinkage characteristics and would reproduce in minute detail the existing cavity.

Wear ratios appear to vary considerably as the proportions of the metals in the alloy are changed as shown by the following table of examples:

| Alloy: | Wear ratio (When machining steel) |
|---|---|
| Pure zinc | 7.9 to 1 |
| 90% zinc 10% tin | 12.1 to 1 |
| 80% zinc 20% tin | 13.4 to 1 |
| 70% zinc 30% tin | 15.0 to 1 |
| 60% zinc 40% tin | 13.4 to 1 |
| 50% zinc 50% tin | 13.0 to 1 |
| 40% zinc 60% tin | 1.0 to 9 |

From the above table, it will be seen that while commercially pure zinc alone is superior to brass from the wear ratio standpoint (besides being easily cast and cheaper), the addition of tin to the zinc effects a startling improvement in wear characteristic, yet the casting and handling characteristics are not materially affected.

For best results when minute details must be reproduced on the electrode, I prefer to pressure cast the electrode, either by the well known plunger means commonly used in die casting, or by building a simple dam around the cavity to be reproduced, pouring the metal, and forcing a plunger down on top of the molten metal manually or by a hydraulic press.

Pressure casting significantly reduces the shrinkage upon solidification. For example, an alloy of 50% zinc and 50% tin cast at atmospheric pressure has a shrinkage of .008" per inch; with normal pressure applied, the shrinkage is only .001" to .0015" per inch.

If the proportion of tin is increased beyond 50%, the wear characteristic drops drastically, as can be seen from the table. While there is a steady improvement in wear characteristic as the proportion of tin is increased up to about 70%, the improvement is small when compared with an alloy consisting of 50% zinc and 50% tin. It may be said, therefore, that the most useful critical range of ingredients is from about 90% zinc 10% tin to about 50% zinc 50% tin, with the optimum being 70% zinc 30% tin.

While the alloy has been developed especially for EDM electrodes, it is suitable also for welding electrodes and is useful generally in any place where the article formed from the alloy is subject to erosion from particle bombardment.

It will be understood that the proportions of alloying ingredients set forth herein are of commercially obtainable grade.

I claim:

1. An electrical-discharge-machining electrode composed of zinc and tin in the proportions of 90% to 50% zinc and 10% to 50% tin.

2. An electrical-discharge-machining electrode composed of zinc and tin in the proportions of 70% zinc and 30% tin.

References Cited in the file of this patent

UNITED STATES PATENTS 1,338,966    De St. Laurent _____ May 4, 1920

FOREIGN PATENTS 2,813    Great Britain _____ Nov. 5, 1857